United States Patent [19]

Vaughan et al.

[11] Patent Number: 5,455,020
[45] Date of Patent: Oct. 3, 1995

[54] GALLIUM SILICATE HAVING 12-RING PORES (ECR-34) AND A METHOD FOR ITS PREPARATION

[75] Inventors: David E. W. Vaughan, Flemington; Karl G. Strohmaier, Port Murray, both of N.J.

[73] Assignee: Exxon Research & Engineering Co., Florham Park, N.J.

[21] Appl. No.: 265,289

[22] Filed: Jun. 24, 1994

[51] Int. Cl.⁶ .......................... C01B 39/04; C01B 39/06
[52] U.S. Cl. .......................... 423/705; 423/709; 423/713; 423/718
[58] Field of Search ...................... 423/705, 709, 423/713, 718; 502/61

[56] References Cited

U.S. PATENT DOCUMENTS

| | | | |
|---|---|---|---|
| 4,554,146 | 11/1985 | Vaughan | 423/705 |
| 4,657,748 | 4/1987 | Vaughan et al. | 423/718 |
| 4,803,060 | 2/1989 | Occelli | 502/61 |
| 4,919,907 | 4/1990 | Occelli | 502/61 |
| 5,096,686 | 3/1992 | Vaughan et al. | 502/61 |

*Primary Examiner*—Mark L. Bell
*Assistant Examiner*—David Sample
*Attorney, Agent, or Firm*—Ronald D. Hantman

[57] ABSTRACT

A synthetic gallosilicate zeolite having a 12-ring pore structure and a process for preparing it.

9 Claims, 2 Drawing Sheets

GALLIUM SILICATE HAVING 12-RING PORES (ECR-34) AND A METHOD FOR ITS PREPARATION

FIELD OF THE INVENTION

This invention relates to a synthetic gallosilicate zeolite, designated as ECR-34, having an apparent 12-ring pore structure, and a process for preparation of the zeolite.

BACKGROUND OF THE INVENTION

The family of materials known as zeolites constitute a large group of silicates having appreciable void volume within their structures. In the ideal state they may be viewed as built from corner shared $SiO_4^{4-}$-tetrahedral building units which form a large range of architectures comprising cavities, channels and cages. In the pure silica forms the structures are charge neutral frameworks stuffed with either neutral molecules, usually water or other neutral solvent molecules, or salt pairs, such as NaCl. These pure silica forms have been designated "clathrasils" or "zeosils" (Liebau et al., Zeolites, v. 6, 373, 1986). More commonly Al substitutes for some of the silica, in which case the framework possesses a net negative charge which is balanced by "exchangeable" cations—commonly those of Groups 1 and 2 of the Periodic Table (Kirk-Othmer Encyclopedia of Chemical Technol., J. Wiley (New York), v. 8, 94, 1965). However, numerous substitutions are now recognized as being possible both in the Si framework substituents and the exchangeable cations, as demonstrated in much of the recent art. A major expansion of these structural types has been achieved with the recognition that $AlPO_4$ has many structures beyond the well known silica analogues of quartz-tridymite -cristobalite (Flanigen et al., Proc. 7th Intl. Zeolite Conf., Ed. Murakami et al., Kodansha/Elsevier (Tokyo), p. 103, 1985). Many zeolites occur as minerals (Tschernich, "Minerals of the World", Geoscience Press (Phoenix, Ariz.) 1992), some of which have no synthetic counterparts. Similarly many synthetic zeolites have no naturally occurring counterparts. The large number of existing known structures has been reviewed by Meier and Olsen (Atlas of Zeolite Structures", Butterworths-Heinemann Press (London), 1992). The unique catalytic, sorption and ion-exchange properties of these zeolite "molecular sieves" have been utilized in many industrial and environmental processes, and numerous consumer products. (As reviewed in the periodic Proceedings of the International Zeolite Conferences).

There are a large number of synthetic methods for producing zeolites, well illustrated in the patent literature and well reviewed by Barrer (in "Hydrothermal Chemistry of Zeolites", Academic Press (London), 1982), Breck (in "Molecular Sieve Zeolites", J. Wiley (New York), 1974) and Jacobs and Martens (in "Synthesis of High Silica Aluminosilicate Zeolites.", Elsevier (Amsterdam), 1987). Reactants may be general or specific and typical reaction conditions are below about 250° C. and 50 bars pressure. The primary solvent is usually water, but others, such as ammonia (e.g., U.S. Pat. No. 4,717,560) and organic liquids (e.g., U.S. Pat. No. 5,160,500), have also been used. Methods for controlling the zeolite type produced, and its composition, include "seeds" as nucleation centers and organic molecules (frequently alkylammonium salts) as structural "templates". The use of alkylammonium salts as templates, or reaction modifiers, in the preparation of crystalline aluminosilicate zeolite, first discovered by Barrer and Denny (J. Chem. Soc, p. 971, 1961) has led to the discovery of a number of zeolites having no natural counterparts. Breck (ibid, pp. 348–378) and Barrer (Zeolites, v. 1, p. 136, 1981) have reviewed the many aluminosilicate zeolites made using templates; Flanigen, et al., (Proc. 7th. Intl. Zeolite Conf., Kodansha/Elsevier (Tokyo), p. 103, 1986) has reviewed the same for the aluminophosphate family. Possible mechanisms of template structure direction have been discussed by Lok et al., (Zeolites, v. 2, 282, 1982) and Vaughan (in Stud. Surf. Sci. Catal., v. 65, 275, 1991).

The substitution of gallium into known zeolite structures is well known and extensively demonstrated (Selbin and Mason, J. Inorg. Nucl. Chem., v. 20, p. 222, 1961; Melchior et al., Amer. Chem. Soc. Symp. Ser., v. 218, p. 231–48, (1983); Newsam and Vaughan, Proc. 7th. Intl. Zeolite Conf., Kodansha/Elsevier (Tokyo), p. 457, 1986). However, non-mineral hydrated gallium silicates are rare. Exceptions are a recent novel structure designated ECR-9 (U.S. Pat. No. 5,096,686) and another new phase we have designated ECR-14. The latter has the unique X-Ray diffraction pattern shown in Table 1, and occurs as an equilibrium replacement phase in the synthesis of ECR-9, particularly at higher temperatures and long crystallization times.

TABLE 1

| 2theta | d(Å) | Relative Intensity |
|---|---|---|
| 13.36 | 6.6241 | 13 |
| 16.91 | 5.2377 | 25 |
| 18.61 | 4.7633 | 5 |
| 20.69 | 4.2889 | 100 |
| 20.97 | 4.2319 | 34 |
| 21.43 | 4.1423 | 14 |
| 21.91 | 4.0528 | 87 |
| 23.41 | 3.7963 | 44 |
| 23.81 | 3.7332 | 32 |
| 24.69 | 3.6022 | 52 |
| 26.89 | 3.3123 | 63 |
| 27.95 | 3.1893 | 8 |
| 28.41 | 3.1386 | 12 |
| 29.69 | 3.0061 | 39 |
| 29.93 | 2.9824 | 61 |
| 32.33 | 2.7664 | 20 |
| 32.63 | 2.7418 | 9 |
| 34.11 | 2.6260 | 51 |
| 34.73 | 2.5806 | 26 |
| 36.95 | 2.4305 | 23 |
| 37.17 | 2.4166 | 10 |
| 37.67 | 2.3856 | 10 |
| 37.91 | 2.3712 | 7 |
| 38.17 | 2.3556 | 7 |
| 40.35 | 2.2332 | 5 |
| 40.53 | 2.2236 | 6 |
| 40.79 | 2.2101 | 7 |
| 41.67 | 2.1654 | 9 |
| 42.05 | 2.1468 | 8 |
| 42.65 | 2.1179 | 6 |
| 46.98 | 1.9326 | 5 |
| 47.39 | 1.9166 | 8 |
| 48.71 | 1.8677 | 13 |
| 50.41 | 1.8086 | 6 |
| 50.69 | 1.7993 | 6 |
| 51.77 | 1.7642 | 7 |
| 54.59 | 1.6796 | 11 |
| 57.15 | 1.6103 | 11 |
| 57.83 | 1.5930 | 11 |
| 58.83 | 1.5683 | 5 |

Both ECR-9 and -14 may have structural building units in-common with ECR-34, indicated by a common unit cell c parameter, shown in Table 2:

TABLE 2

| Zeolite | Symmetry | aÅ | bÅ | cÅ |
| --- | --- | --- | --- | --- |
| ECR-9 | orthorhombic | 14.2 | 16.2 | 8.6 |
| ECR-14 | orthorhombic | 9.2 | 9.5 | 8.6 |
| ECR-34 | hexagonal | 21.0 | — | 8.6 |

SUMMARY OF THE INVENTION

The present invention relates to a new zeolite structure and composition, designated herein for convenience as ECR-34. It is unusual in that, as presently researched, it seems to have no aluminosilicate counterpart. Neither does it have any known mineral analogue. It has a chemical composition, expressed conventionally in terms of mole ratios of oxides, in the range:

0.9 to 1.2 (Na, K, TEA)$_2$O: (Ga, Al)$_2$O$_3$:3 to 10 SiO$_2$: 0 to 12 H$_2$O

TEA represents tetraethylammonium cations. Up to 10% of the Ga can be replaced by Al (present in the seed component), and depending on the degree of hydration and level of TEA, water may represent up to about 20% wt. of the sample weight. Indexing of the powder X-ray diffraction pattern (Table 3 and 4; FIG. 1) predicts a hexagonal unit cell with approximate dimensions: a=21 Å and c=8.6 Å. The crystals of ECR-34 so far made are too small for single crystal structural analysis. The thermogravimetric analyses indicate that the "burn off" of the TEA template occurs at about 365° C. (FIG. 2)—this is an indication that the ECR-34 structure probably includes 12-ring channels. This would also correlate with the large unit cell dimension.

ECR-34 is prepared from a gallosilicate gel having a composition:

0.4 to 1.8 Na$_2$O: .1 to 1.0 K$_2$O: 0.8 to 2.6 TEA$_2$O: (Ga, Al)$_2$O$_3$: 4 to 14 SiO$_2$: 80 to 350 H$_2$O.

Although aluminosilicate seeds are a desirable addition from the viewpoint of shorter crystallization times, they are not necessary for the formation of ECR-34. Seeding may also be accomplished with ground or cryo-chopped ECR-34 products. All three cations are necessary for ECR-34 synthesis. The removal of K+ induces the formation of gallium faujasite, and in the absence of Na+ ECR-9 (U.S. Pat. No. 5,096,686) or ECR-14 crystallize. In non-optimized syntheses, gallium beta is a common impurity. ECR-34 crystallizes in a limited range within the broader composition field of ECR-9, and is isolated at lower (TEA+K) and lower H$_2$O contents. Co-crystallization is common.

The x-ray diffraction pattern for ECR-34 has the major peaks indicated in Table 3 below, and shown in FIG. 1 for the cation forms described.

TABLE 3

| 2θ | d(Å) | Relative Intensity (%) |
| --- | --- | --- |
| 4.8–4.9 | 18.4–18.0 | 74–100 |
| 8.4–8.5 | 10.5–10.4 | 60–80 |
| 11.3–11.4 | 7.82–7.76 | 20–40 |
| 14.6–14.7 | 6.06–6.02 | 10–25 |
| 16.8–17.0 | 5.27–5.21 | 10–25 |
| 20.3–20.5 | 4.37–4.33 | 10–25 |
| 22.0–22.2 | 4.04–4.00 | 10–25 |
| 22.8–22.9 | 3.90–3.88 | 10–25 |
| 23.6–23.8 | 3.77–3.74 | 15–30 |
| 25.3–25.4 | 3.52–3.50 | 10–25 |
| 26.5–26.7 | 3.36–3.34 | 15–30 |
| 26.7–26.8 | 3.34–3.32 | 15–30 |
| 29.2–29.3 | 3.06–3.05 | 10–25 |
| 30.5–30.7 | 2.929–2.910 | 15–30 |
| 31.2–31.3 | 2.864–2.855 | 15–30 |
| 31.6–31.7 | 2.829–2.820 | 10–25 |

TABLE 3-continued

The gallosilicate herein may be used as a sorbent or as a catalyst for hydrocarbon conversion.

In another embodiment of this invention, the novel zeolite may be prepared by a process comprising:

(a) preparing a reaction mixture comprising a mixture of an oxide of sodium, an oxide of potassium and a tetraethyl-ammonium (TEA) salt, water, a source of silica, and sodium aluminosilicate nucleating seeds, said reaction mixture having a composition, in terms of mole ratios of oxides, within the following ranges:

| | |
| --- | --- |
| Na$_2$O:(Ga, Al)$_2$O$_3$ | .4 to 1.8 |
| K$_2$O:(Ga, Al)$_2$O$_3$ | .1 to 1.0 |
| TEA$_2$O:(Ga, Al)$_2$O$_3$ | 0.8 to 2.6 |
| SiO$_2$:(Ga, Al)$_2$O$_3$ | 4.0 to 16 |
| H$_2$O:(Ga, Al)$_2$O$_3$ | 80 to 350 | and said seeds being present in an amount to yield 0.1 to 10 mole percent replacement of the total final gallia content in said gallosilicate;

(b) blending the reaction mixture sufficiently to form a substantially homogeneous mixture;

(c) maintaining the reaction mixture at a temperature between about 80° C. and 120° C. under autogenous pressure for a sufficient period of time to form crystals of the aluminosilicate; and (d) recovering the gallosilicate crystals.

DESCRIPTION OF THE PREFERRED EMBODIMENT

Figure 1:
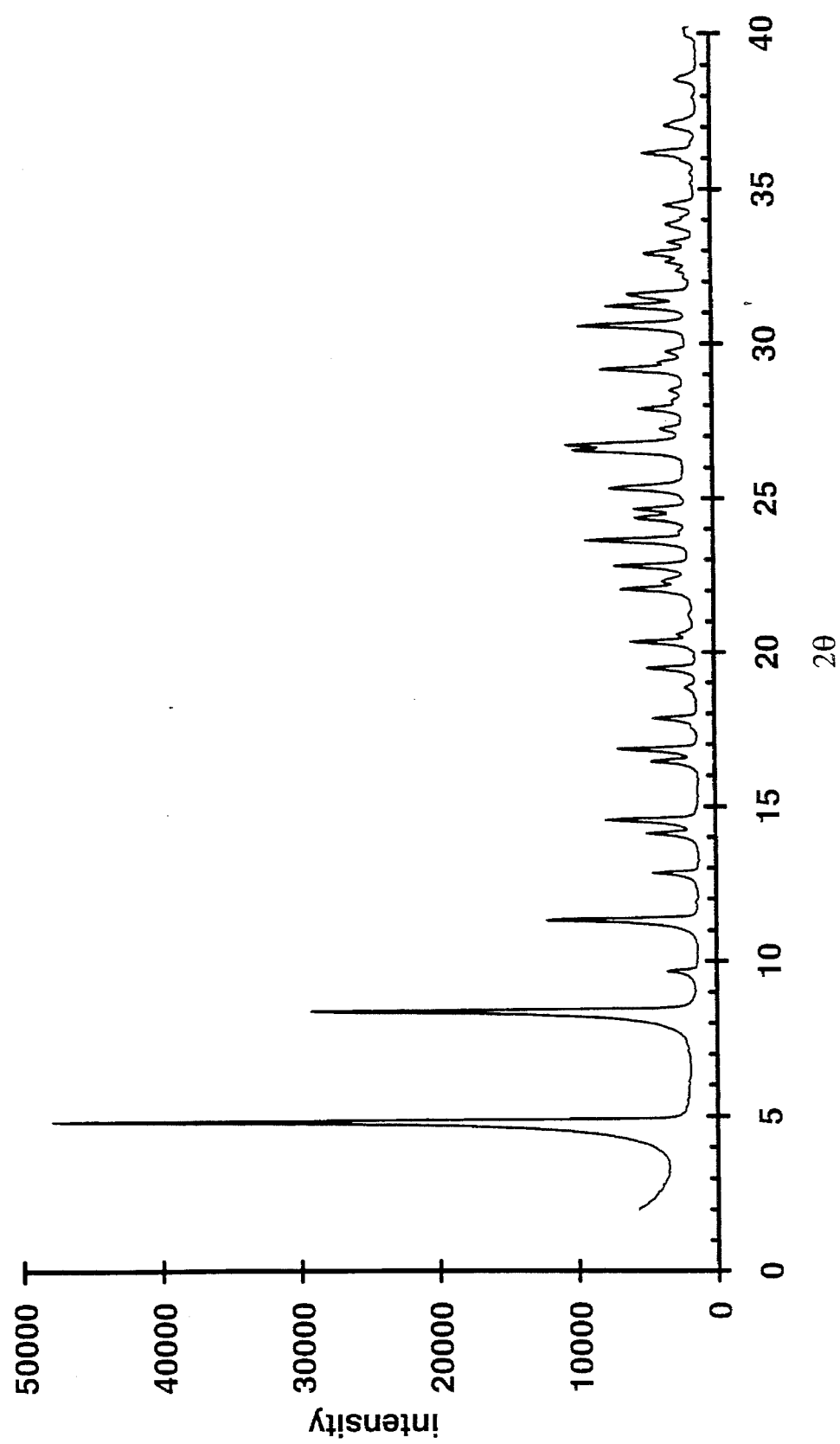
FIG. 1 shows the x-ray diffraction pattern of ECR-34.

The new material is a new structure, having a novel x-ray diffraction pattern (Table 1, FIG. 1) which can be indexed on a hexagonal unit cell with about a=21 Å and c=8.61Å. TGA shows a distinctive template loss at about 350° C., indicating that the structure probably has a 12-ring ($\geq 7$ Å) window or pore structure.

ECR-34 is preferably synthesized from a gel having a SiO$_2$/Ga$_2$O$_3$ ratio in the range 4 to 12 in the presence of Na$^+$, K$^+$ and TEA$^+$ cations, reacted at 90°–120° C. for between about 7 and 35 days. The preferred gel composition is in the range:

(0.4 to 1.8 Na$_2$O):(0.1 to 1.0 K$_2$O):(0.8 to 2.6TEA 2O):(Ga, Al)$_2$O:4–14 SiO$_2$: 80 to 350 H$_2$O and product compositions have SiO$_2$/Ga$_2$O$_3$ in the range 3 to 10. Although seeding may promote the formation of ECR-34, it is not necessary for its synthesis.

Figure 2:
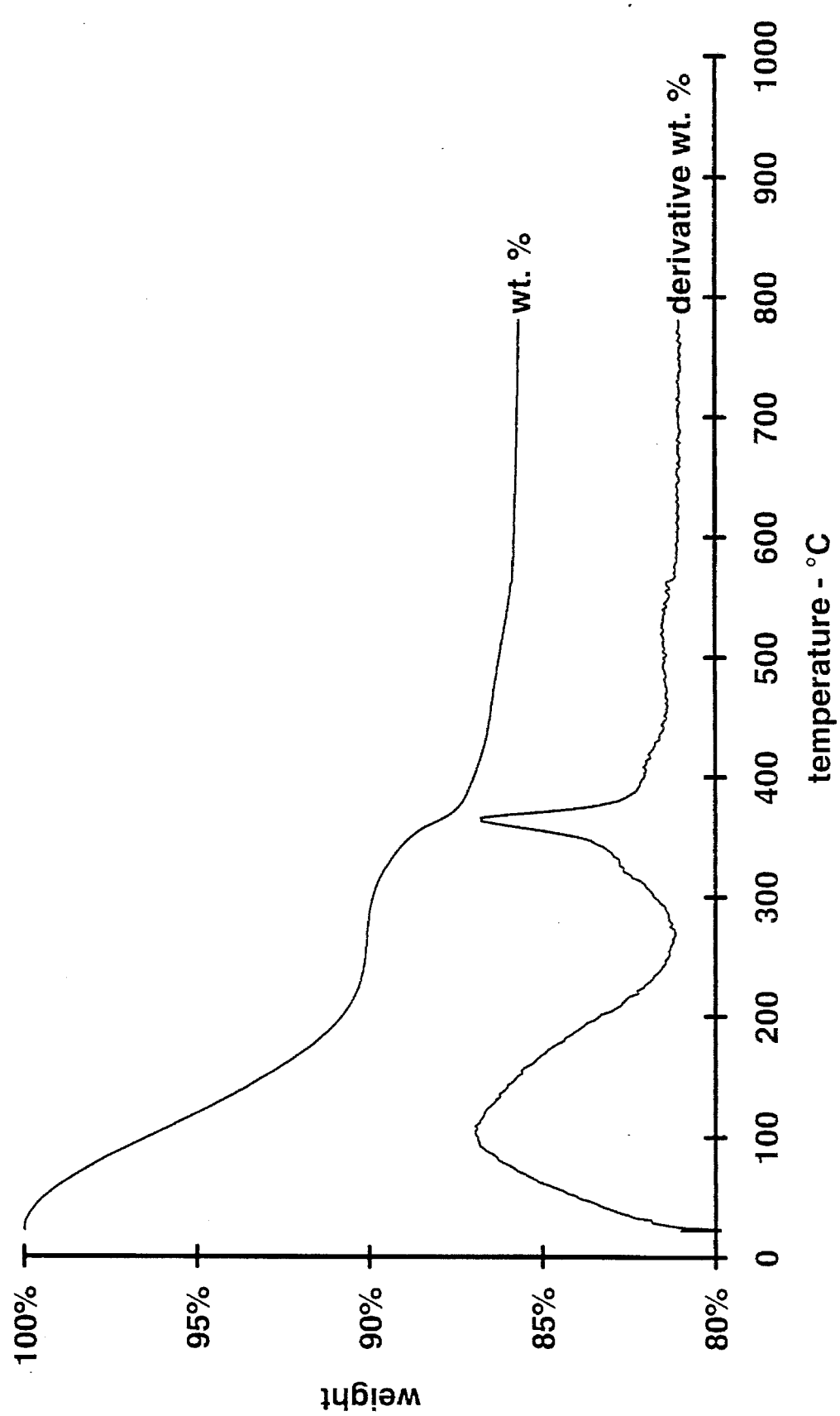
FIG. 2 shows the thermogravimetric analysis of ECR-34.

The number of waters of hydration will not be the same for each preparation and will depend mainly on the degree to which the gallosilicate is dried, and the amount of trapped TEA template. As is shown in FIG. 2, the organic template decomposes and leaves the zeolite at a temperature of about 365° C. when calcined in air. Removal of the TEA by calcination is a necessary step in the conversion of ECR-34 to a useful catalyst or sorbent.

In order to convert the inventive zeolites into useful sorbents and catalysts, exchangeable cations are usually partially or fully replaced with those found most desirable for the process of interest. The exchangeable cation may be metals from any one of Groups I through VIII of the Periodic Table or rare earth metals, depending on the end use desired. Preferably, the cations will be mono-, di- and trivalent metal cations, particularly from Groups I, II or III of the Periodic Table, such as barium, calcium, cesium, lithium, magnesium, potassium, strontium, zinc, or the like, hydrogen, rare earth cations or ammonium. The presence of these exchangeable cations will generally not cause a substantial alteration of the basic crystal structure of the gallosilicate. Particularly preferred are mono- and divalent cations, as they are more easily included in the pores of the zeolite crystal. Any ion exchange technique may be employed such as those discussed, for example, in U.S. Pat. No. 3,216,789.

The gallosilicate herein may be prepared by a process in which a reaction mixture, generally a gel or slurry, is formed of an oxide of potassium, sodium, water, TEA a source of silica, a source of gallium, and sodium (aluminosilicate) nucleating seeds. The oxides of potassium and sodium are derived From the hydroxides. The TEA may be added either as a hydroxide or acid salt, usually the chloride or bromide. The silica may be derived from sources such as, e.g., silica gels, silica acid, aqueous colloidal silica sols as described, for example, in U.S. Pat. No. 2,574,902, reactive amorphous solid silicas such as fume silicas and chemically precipitated silica sols. The preferred sources of gallium are sodium and potassium gallate and a gallium salt selected from the chloride, sulfate and nitrate salts.

The silicate nucleating seeds, if used in the reaction mixture, also known as zeolitic nucleation centers, comprise of a slurry of zeolite solids having the following components: $SiO_2$, $Al_2O_3$, $Na_2O$ and $H_2O$. Generally, the seeds will have an average particle size less than 0.05 microns. The composition of the nucleating seeds in the slurry may be in the approximate ranges, in terms of mole ratios of oxides, as follows:

4 to 30 $Na_2O$:1 to 9 $Al_2O_3$:3 to 30 $SiO_2$:250 to 2000 $H_2O$

Such slurries of nucleating seeds may be prepared by the process disclosed is U.S. Pat. Nos. 3,433,589; 3,808,326 and 4,178,352, the disclosures of which are incorporated by reference. In general, the preparation procedure involves mixing of sodium silicate, sodium aluminate and water together and aging the resulting slurry at about 0° to 90° C. for about 1 to 500 hours, with lower temperatures requiring a longer period of time. Preferably, the slurry is aged at about 15° to 40° C. for about 20 to 400 hours and the zeolite centers have compositions in the range:

10 to 16 $Na_2O$:1 to 9 $Al_2O_3$:10 to 15 $SiO_2$:250 to 2000 $H_2O$

When used, the amount of nucleating seeds present in the reaction mixture is expressed in terms of the percentage of the total molar alumina content in the gallosilicate product which is ultimately recovered on crystallization. Thus, for example, if 5 molar percent of the nucleating seeds is added to the mixture, the seeds are contributing 5% of the total molar amount of alumina plus gallium in the zeolite product recovered. In general, the seeds are present in an amount to yield 0.1 to 10 mole percent of the total final alumina plus gallium content of the product, and preferably 0.1 to 5 mole percent.

Slurries comprising recycled products of the process disclosed herein may also serve as nucleation seeds, as will ground or cryochopped dried ECR-34 products.

The relative amounts of ingredients in the reaction mixture will be such that the mixture has a composition, in terms of mole ratios of oxides, within the following ranges:

| Oxide Constituents | Usual Ranges of Mole Ratios | Preferred Ranges of Mole Ratios |
|---|---|---|
| $N_2O$:(Ga, $Al)_2O_3$ | 0.4 to 1.8 | 0.5 to 1.5 |
| $K_2O$/(Ga, $Al)_2O_3$ | 0.1 to 1.0 | 0.1 to 1.0 |
| $(TEA)_2O$:(Ga, $Al)_2O_3$ | 0.8 to 2.8 | 1 to 2.0 |
| $SiO_2$:(Ga, $Al)_2O_3$ | 4 to 14 | 7 to 12 |
| $H_2O$:(Ga, $Al)_2O_3$ | 80 to 350 | 100 to 200 |

The order of mixing the ingredients is not important, and all ingredients may be added simultaneously. The reaction mixture is ordinarily prepared in a container made of glass, TEFLON, or metal or the like which should be closed to prevent water loss. When the process is practiced without using seeds, the same sequence is used except that the seeds are excluded.

After the reaction mixture is formed it may be homogenized by thorough blending so as to be substantially homogeneous in texture. This step is to ensure that the aluminosilicate product ultimately obtained is not a mixture of products and thus impure.

The homogenized mixture is then placed in a reactor, ordinarily one which can withstand elevated pressures such as a tetrafluoroethylene-lined jar or an autoclave, where it is maintained at a temperature of between about 80° C. and 160° C., preferably 80° and 120° C., and, for commercial purposes, preferably no greater than 100° C. When the homogenized mixture is heated it is maintained at autogeneous pressures which will depend on the temperature employed. The amount of time required for heating will depend mainly on the temperature employed, so that at 100° C. the heating may be carried out, e.g., for up to 40 days or more, whereas at 150° C. the time period may be, e.g., 10 days. In any event, the heating is carried out until crystals are formed of the gallosilicate zeolite product, i.e., ECR-34.

When the gallosilicate crystals have been obtained in sufficient amount, they are recovered by cetrifugation or filtration from the reaction mixture and are then washed, preferably with deionized water, to separate them from the mother liquor. The washing should continue, for best purity results, until the wash water, equilibrated with the product, has a pH of between about 9 and 12. After the washing step the zeolite crystals may be dried, and then calcined in an oxygen-containing atmosphere to remove the organic ions. Once the large organic ions are removed, the structure is accessible to larger molecules, and is useful as a catalyst or sorbent. Such materials being optimized by converting to specific ion exchanged forms.

EXAMPLES

The examples which follow illustrate the invention. In all examples, parts and percentages are given by weight and temperatures in degrees Centigrade unless otherwise noted.

Example 1

A reaction mixture having the following oxide ratios:

0.50 $K_2O$: 1.3 $(TEA)_2O$: 0.6 $Na_2O$: $(0.98Ga, 0.02Al)_2O_3$: 9 $SiO_2$: 140 $H_2O$:

0.64 $Na_2SO_4$ was made by first dissolving 7.28 g. $Ga_2O_3$ in a solution containing 2.59 g. $KOH.1/2H_2O$, 3.14 g. NaOH and 8 ml. $H_2O$. This solution was heated to a boil until a paste started to form. Cooled down slightly and added 5 ml. $H_2O$. In a plastic beaker were mixed 52.1 g. Ludox HS-40 silica (duPont Co.), 5.2 g. of a "seed" solution (13.33 $Na_2O$: $Al_2O_3$: 12.5 $SiO_2$: 267 $H_2O$, see U.S. Pat. Nos. 3,574,538 and 4,340,573 herein included by reference), 38.0 g. of a 40% aqueous solution of tetraethylammonium hydroxide (RSA Corp., reagent grade), sodium-potassium gallate solution, and 2.58 g. conc. $H_2SO_4$ in 10 ml. $H_2O$. The total weight of the mixture was adjusted to 150 g. by addition of $H_2O$, and then thoroughly homogenized in a blender. It was placed in a 125 mol. teflon bottle and reacted at 100° C. for 14 days. The product was filtered, washed with distilled $H_2O$, and dried in an 115° C. oven. The x-ray powder diffraction pattern showed the product to be crystalline ECR-34 and trace faujasite impurity.

Example 2

A reaction mixture having the following oxide ratios:

0.67 $K_2O$: 1.73 $(TEA)_2O$: 0.8$Na_2O$: $(0.98Ga, 0.2Al)_2O_3$: 12 $SiO_2$: 180 $H_2O$: 0.27 $Na_2SO_4$ was made by first dissolving 11.0 g. $Ga_2O_3$ in a solution containing 5.23 g. $KOH.1/2H_2O$, 3.90 g. NaOH and 15.0 ml. $H_2O$. This solution was heated to a boil until a paste started to form. It was cooled down slightly and $H_2O$ then added to bring the weight to 38.4 g. In a plastic beaker were mixed 49.9 g. Ludox HS-40 silica (duPont Co.), 3.67 g. of a "seed" solution (13.33 $Na_2O$: $Al_2O_3$: 12.5 $SiO_2$: 267 $H_2O$, see U.S. Pat. Nos. 3,574,538 and 4,340,573), 36.1 g. of a 40% aqueous solution of tetraethylammonium hydroxide (RSA Corp., reagent grade), 18.1 g. sodium-potassium gallate solution, 1.44 g. 48% $H_2SO_4$ and 0.20 g. of ECR-34 from example 1 above. The total weight of the mixture was adjusted to 135 g. by addition of $H_2O$, and then thoroughly with distilled $H_2O$, and dried in an 115° C. oven. The x-ray powder homogenized in a blender. It was placed in a 125 mol. teflon bottle and reacted at 100° C. for 17 days. The product was filtered, washed diffraction pattern is given in Table 4 and FIG. 1 and shows the product to be crystalline ECR-34. The pattern can be indexed on a hexagonal unit cell of a=20.99 Å and c=8.61 Å. Elemental analysis by ICP-AES and AA gave: 0.29% Al; 23.1% Si; 5.98% K; 2.47% Na; 17.4% Ga. Thermogravimetric analysis is shown in FIG. 2 and gives a 4.14% weight loss. These data indicate a product stoichiometry of 0.12 $(TEA)_2$: 0.41 $Na_2O$: 0.59 $K_2O$: $(0.96Ga, 0.04Al)_2O_3$: 6.32 $SiO_2$

Example 3

A reaction mixture having the following oxide ratios:

.67 $K_2O$ .73 $(TEA)_2O$: .8 $Na_2O$: $(.98Ga, .2Al)_2O_3$:12 $SiO_2$: 180 $H_2O$: .27 $Na_2SO_4$ was made by first dissolving 5.77 g. $Ga_2O_3$ in a solution containing 2.73 g. $KOH.1/2H_2O$, 2.06 g. NaOH and 8 ml. $H_2O$. This solution was heated to a boil until a paste started to form. It was cooled down slightly and 10 ml. $H_2O$ was added. In a plastic beaker were mixed 55.4 g. Ludox HS-40 silica (duPont Co.), 4.07 g. of a "seed" solution (13.33 $Na_2$): $Al_2O_3$: 12.5 $SiO_2$: 267 $H_2O$, see U.S. Pat. Nos. 3,574,538 and 4,340,573), 40.1 g. of a 40% aqueous solution of tetraethyl-ammonium hydroxide (RSA Corp., reagent grade) sodium-potassium gallate solution, and 1.7 g. 48% $H_2SO_4$. The total weight of the mixture was adjusted to 150 g. by addition of $H_2O$, and then thoroughly homogenized in a blender. It was placed in a 125 ml. teflon bottle and reacted at 100° C. for 34 days. The product was filtered, washed with distilled $H_{2yO}$, and dried in an 115° C. oven. The x-ray powder diffraction pattern shows the product to be crystalline ECR-34 and some zeolite beta.

Chemical analysis of this sample gave 16.5% Ga, 0.20% Al 23% Si, 1.29% Na and 6.07% K, representing a Si/(Al, Ga) ratio of 3.36 and Al/Ga ratio of 0.03.

TABLE 4

X-ray d-spacings and relative intensities of ECR-34

| No. | 2Theta | d | Rel I (%) |
|---|---|---|---|
| 1 | 4.866 | 18.1464 | 100.0 |
| 2 | 8.443 | 10.4640 | 73.4 |
| 3 | 8.725 | 9.0874 | 6.6 |
| 4 | 11.369 | 7.7767 | 31.8 |
| 5 | 12.890 | 6.8622 | 11.4 |
| 6 | 14.135 | 6.2606 | 7.4 |
| 7 | 14.630 | 6.0497 | 18.6 |
| 8 | 16.513 | 5.3638 | 9.4 |
| 9 | 16.892 | 5.2445 | 13.0 |
| 10 | 17.874 | 4.9583 | 8.6 |
| 11 | 18.947 | 4.6800 | 3.1 |
| 12 | 19.534 | 4.5405 | 10.1 |
| 13 | 20.414 | 4.3468 | 13.0 |
| 14 | 22.097 | 4.0194 | 15.7 |
| 15 | 22.855 | 3.8879 | 16.4 |
| 16 | 23.677 | 3.7546 | 20.5 |
| 17 | 24.397 | 3.6455 | 11.0 |
| 18 | 24.681 | 3.6042 | 11.2 |
| 19 | 25.358 | 3.5094 | 15.6 |
| 20 | 26.619 | 3.3460 | 21.4 |
| 21 | 26.759 | 3.3288 | 19.0 |
| 22 | 27.279 | 3.2664 | 4.6 |
| 23 | 27.939 | 3.1908 | 11.1 |
| 24 | 28.200 | 3.1619 | 4.7 |
| 25 | 28.599 | 3.1186 | 4.4 |
| 26 | 29.239 | 3.0519 | 14.6 |
| 27 | 29.459 | 3.0296 | 7.6 |
| 28 | 29.784 | 2.9972 | 3.9 |
| 29 | 30.603 | 2.9189 | 21.7 |
| 30 | 31.262 | 2.8588 | 19.8 |
| 31 | 31.641 | 2.8254 | 14.5 |
| 32 | 32.462 | 2.7558 | 3.8 |
| 33 | 32.682 | 2.7378 | 5.4 |
| 34 | 32.962 | 2.7151 | 10.9 |
| 35 | 33.343 | 2.6849 | 5.3 |
| 36 | 33.907 | 2.6416 | 5.5 |
| 37 | 34.523 | 2.5958 | 6.7 |
| 38 | 36.224 | 2.4778 | 11.0 |
| 39 | 37.128 | 2.4195 | 7.1 |
| 40 | 38.588 | 2.3312 | 4.1 |
| 41 | 40.008 | 2.2517 | 2.3 |
| 42 | 40.174 | 2.2428 | 2.6 |
| 43 | 40.505 | 2.2252 | 2.4 |
| 44 | 43.053 | 2.0993 | 2.6 |
| 45 | 44.633 | 2.0285 | 3.5 |
| 46 | 45.514 | 1.9913 | 4.5 |
| 47 | 45.891 | 1.9758 | 2.0 |
| 48 | 48.916 | 1.8605 | 2.4 |
| 49 | 51.256 | 1.7809 | 4.2 |
| 50 | 53.022 | 1.7257 | 2.4 |
| 51 | 53.296 | 1.7174 | 2.6 |
| 52 | 53.598 | 1.7085 | 3.0 |
| 53 | 56.361 | 1.6311 | 2.7 |

TABLE 4-continued

X-ray d-spacings and relative intensities of ECR-34

| No. | 2Theta | d | Rel I (%) |
|---|---|---|---|
| 54 | 57.398 | 1.6040 | 3.0 |

We claim:

1. A synthetic zeolite having an overall chemical composition:

0.9 to 1.2 (TEA,K,Na)$_2$O: (Ga, Al)$_2$O$_3$:3–10 SiO$_2$: 0–12 H$_2$O and substantially the x-ray diffraction pattern shown in Table 3.

2. A process for preparing the zeolite of claim 1 which comprises:

(a) preparing a reaction mixture comprising an oxide of sodium, an oxide of potassium, water, a source of silica, a source of gallia, a tetraethylammonium ion source and, optionally, sodium aluminosilicate nucleating seeds, said reaction mixture having a composition, in terms of mole ratios of oxides, within the following ranges:

| | |
|---|---|
| K$_2$O:(Ga, Al)$_2$O$_3$ | 0.1 to 1.0 |
| Na$_2$O:(Ga, Al)$_2$O$_3$ | 0.4 to 1.8 |
| (TEA)$_2$O:(Ga, Al)$_2$O$_3$ | 0.8 to 2.6 |
| SiO$_2$:(Ga, Al)$_2$O$_3$ | 4 to 14 |
| H$_2$O:(Ga, Al)$_2$O$_3$ | 80 to 350 | and said seeds, when present, in an amount to yield 0.1 to 10 mole percent of the total final (Ga, Al) content in said zeolite;

(b) blending the reaction mixture sufficiently to form a substantially homogeneous mixture;

(c) maintaining the reaction mixture at between about 80° C. and 160° C. under autogenous pressure for a sufficient period of time to form crystals of said zeolite; and (d) recovering said zeolite crystals.

(e) calcining said zeolite at a temperature over about 320° C.

3. The process of claim 2 wherein the zeolite has a composition, in terms of mole ratios of oxides, in the range:

0.9 to 1.2 (TEA,K,Na)$_2$):(Ga, Al)$_2$O$_3$:4 to 8 SiO$_2$: 0–12 H$_2$O.

4. The process of claim 2 wherein no seeds are used and the zeolite has a composition, in terms of mole ratios, within the range:

0.9 to 1.2 (TEA, Na,K)$_2$O: Ga$_2$O$_3$: 3–10 SiO$_2$: 0–12 H$_2$O

5. The process of claim 2 wherein the reaction mixture is maintained between 90° and 120° C.

6. The process of claim 5 wherein the seeds are present in an amount to yield 1 to 10 mole percent of the total final alumina and gallia content.

7. A process of claim 2 wherein the source of silica is a colloidal silica and the source of gallium is (Na, K) gallate and a gallium salt selected from the group consisting of chloride, sulfate and nitrate salts.

8. The process of claim 2 further comprising ion-exchanging the calcined zeolite with one or more cations from groups 1 to 8 of the periodic table.

9. The cation exchanged ECR-34 product of claim 8.

* * * * *